June 8, 1948.　　　T. J. PUTZ ET AL　　　2,443,054
GAS TURBINE PLANT
Filed Nov. 7, 1946
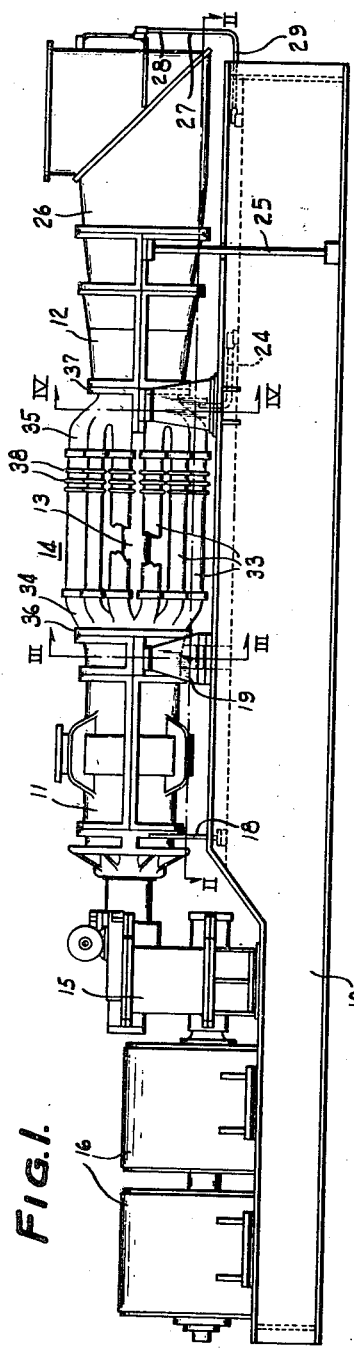
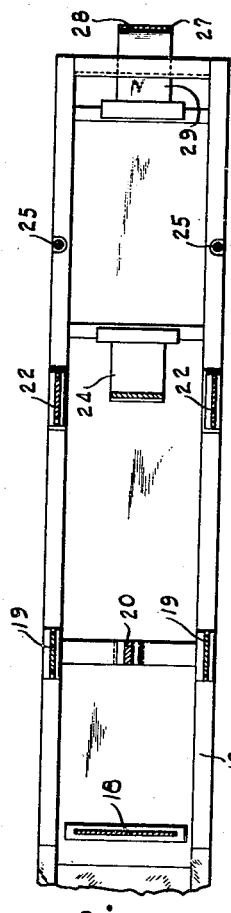
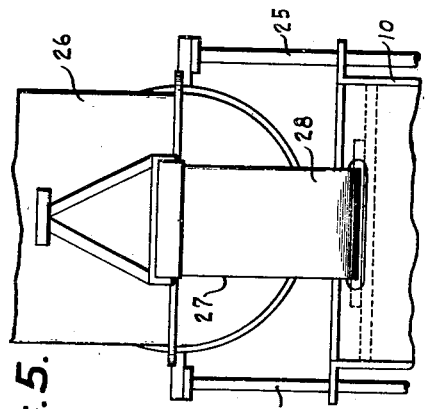
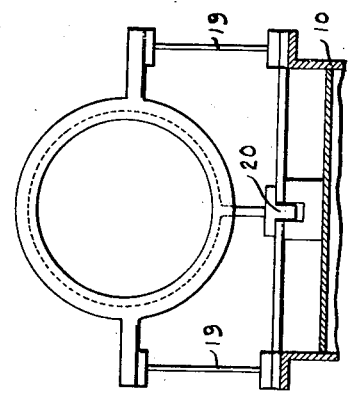
WITNESSES:
V. W. Novak.
H. B. Braun.
INVENTORS
Thomas J. Putz
Kenneth R. Stearns
BY
ATTORNEY Patented June 8, 1948

2,443,054

UNITED STATES PATENT OFFICE 2,443,054

GAS TURBINE PLANT

Thomas J. Putz, Upper Darby, and Kenneth R. Stearns, Springfield, Pa., assignors to Westinghouse Electric Corporation, East Pittsburgh, Pa., a corporation of Pennsylvania Application November 7, 1946, Serial No. 708,326

10 Claims. (Cl. 60—41)

The invention relates to a power plant including an axial-flow compressor, an axial-flow turbine aligned with the compressor, and combustion apparatus interposed between and carried by the adjoining compressor discharge and turbine inlet ends and it has for an object to provide improved means for supporting the compressor and the turbine so that the axes thereof are maintained in fixed vertical and horizontal planes with capability of movements of the compressor and of the turbine axially and radially to accommodate for expansion and contraction.

A further object of the invention is to provide apparatus of the above character wherein the adjoining ends of the compressor and of the turbine are supported by vertically-disposed web plates having their upper ends connected to the compressor and the turbine approximately at the horizontal plane of the axes thereof, such plates resisting axial movement of the adjoining compressor and turbine ends while providing for radial expansion and contraction thereof horizontally.

A further object of the invention is to provide, with the compressor and turbine flexibly supported so as to maintain the axes thereof in a horizontal plane, flexible web plates arranged in planes normal to the vertical plane of the aligned compressor and turbine axes so as to provide stiffness opposing movement of the axes from the vertical plane.

Another object of the invention is to provide apparatus of the above character wherein the flexible supporting means includes vertical rods for supporting the exhaust end of the turbine, together with a flexible plate having horizontal and vertical web portions arranged, respectively, parallel to the turbine axis and normal to the latter to restrict freedom of movement of the exhaust end of the turbine permitted by the rods to axial and radial directions.

The foregoing and other objects are effected by the invention as will be apparent from the following description and claims taken in connection with the accompanying drawings, forming a part of this application, in which:

Fig. 1 is a side elevational view of a plant showing the improved supporting means;

Fig. 2 is a sectional view taken along the line II—II of Fig. 1 and showing the location and arrangement of the various flexible supports;

Figs. 3 and 4 are sectional views taken along the lines III—III and IV—IV of Fig. 1; and Fig. 5 is an end elevation as viewed from the right of Fig. 1.

In the drawings, there is shown a gas turbine power plant including a bedplate 10 upon which is mounted a compressor 11, a gas turbine 12 axially aligned with the compressor and having its rotor connected to the compressor rotor by the shaft 13, and combustion apparatus, at 14, supported by the adjoining compressor discharge and turbine inlet ends. The turbine 12 drives the compressor 11 and transmits power through the reduction gearing 15 to one or more electric generators 16, the reduction gearing and the generator or generators being also mounted on the bedplate.

The compressor 11 withdraws air from the atmosphere and compresses and discharges it to the combustion apparatus to support combustion of fuel supplied to the latter and to admix with the products of combustion to provide motive fluid of temperature suitable for the turbine. The present invention is concerned with flexible means for supporting said arrangement of compressor, combustion apparatus and turbine so that the compressor and turbine axes are maintained in position vertically and horizontally and the compressor and the turbine are each restrained against axial movement at one end with capability thereof to expand and contract radially in all directions where required.

The compressor is supported, at its inlet end, by the vertical flexible web plate 18, and, at its discharge end, by the pair of vertical web plates 19, 19, the plates 18 and 19, 19 having their lower ends connected to the bedplate and their upper ends connected to the compressor. Also, the discharge end of the compressor is connected to the bedplate by means, for example, of the plate 20.

The turbine 12 has its inlet end supported from the bedplate by the pair of vertical web plates 22, 22, whose lower and upper ends are connected to the bedplate and the turbine, respectively, and the lower portion of the turbine inlet end is connected to the bedplate by the flexible web 24. The turbine is supported at its exhaust end by the vertical columns 25, 25, whose upper and lower ends are connected to the turbine and to the bedplate, respectively.

The exhaust portion 26 of the turbine is connected to the bedplate by the flexible angle web plate 27 having a vertical portion 28 connected to the turbine exhaust portion and a horizontal web 29 connected to the bedplate.

The structure described provides for the compressor and the turbine being supported from the bedplate so that the aligned axes thereof are held vertically and horizontally and so that the compressor and the turbine are capable of expansion and contraction axially and radially.

Since the plate 18 is connected to the compressor and has its plane normal to the axis of the latter, it resists displacement of such axis, both vertically and horizontally, and provides flexibility accommodating for axial expansion and contraction of the compressor.

As the plates 18, 19 are parallel to the compressor axis and have their upper ends connected to the compressor substantially at the horizontal plane of such axis and at opposite sides of the latter, they resist axial displacement of the discharge end of the compressor and displacement of the rotor axis vertically while accommodating for radial expansion and contraction of the compressor discharge end horizontally.

As the plates 19, 19 and 22, 22 extend parallel to the compressor and turbine axes and are connected to the compressor and the turbine substantially at the horizontal plane of such axes, they hold the adjacent compressor discharge and turbine inlet ends against axial movement while accommodating for radial expansion and contraction thereof horizontally. Both the compressor and the turbine are free to expand and contract radially and vertically in an upward direction, the plate connection 20 accommodating for radial expansion and contraction of the discharge end of the compressor vertically; and, as the plate 24 extends horizontally and parallel to the turbine axis, it not only functions to resist horizontal displacement of such axis, but it flexes to accommodate for radial expansion and contraction of the lower portion of the turbine inlet vertically.

As the columns 25 are equally flexible in all transverse directions, they carry the load and are capable of flexing to accommodate for radial expansion and contraction horizontally and to accommodate for axial expansion and contraction of the exhaust end of the turbine.

Since the angle plate 27 has a portion parallel to the turbine axis and normal to the vertical plane of the latter and a portion which is normal both with respect to the horizontal and vertical planes of such axis, it is capable of flexing to accommodate for radial expansion and contraction of the turbine exhaust end vertically and to accommodate for expansion and contraction of the turbine axially while maintaining the vertical alignment.

To summarize with respect to supporting the compressor and the turbine with their axes in fixed horizontal and vertical planes while accommodating for expansion and contraction both axially and radially, the axes are maintained in a fixed horizontal plane by the plates 18, 19, 19, and 22, 22 and the columns 25; the axes are maintained in a fixed vertical plane by the plates 18, 24 and 27 and the plate connection 20; the adjacent compressor and turbine ends are held in fixed positions axially by the plates 19, 19 and 22, 22; radial expansion and contraction of the compressor and of the turbine are accommodated for by the plates 19, 19, 22, 22, 24 and 27 and the columns 25; and axial expansion and contraction of the turbine and compressor are accommodated for by the plates 18 and 27 and the columns 25.

As the vertical flexible supporting plates 19, 19 and 22, 22 serve to fix the adjoining compressor discharge and turbine inlet ends axially and as the combustion apparatus, at 14, is connected to and carried by such adjoining ends, it is necessary that such apparatus shall incorporate features accommodating for its expansion and contraction. As illustrated, the combustion apparatus includes a circumferential arrangement of combustion units 33 encompassing the rotor connecting shaft 13. The opposite ends of the combustion unit housings are connected to the conduit portions 34 and 35 of ring adapters 36 and 37 attached to the compressor and to the turbine, respectively. Therefore, with compressed air supplied through the conduits 34 to the combustion units and with fuel supplied thereto in a manner well known in the art, such units provide for combustion of such fuel supported by the compressed air with the products of combustion diluted sufficiently by the air to provide gaseous motive fluid of a temperature suitable for operation of the turbine, the combustion units discharging such gaseous motive fluid through the conduit sections 35 and ring adapter 37 to the turbine. To accommodate for expansion and contraction of the combustion unit housings between the ring adapters, each of such housings includes an accordion or bellows section 38. While the invention has been shown in but one form, it will be obvious to those skilled in the art that it is not so limited, but is susceptible of various changes and modifications without departing from the spirit thereof.

What is claimed is:

1. In a gas turbine plant, a bedplate, a compressor, a turbine, means carried by the bedplate for supporting the compressor and the turbine so as to maintain the rotor axes of the latter aligned and in predetermined horizontal and vertical planes and so as to accommodate for radial and axial expansion and contraction of the compressor and of the turbine, combustion apparatus supported by adjacent ends of the compressor and the turbine, said combustion apparatus being supplied with air by the compressor and delivering gaseous motive fluid to the turbine; said compressor and turbine supporting means comprising a plate attached at opposite ends to the bedplate and to the inlet end of the compressor and disposed so as to resist vertical and horizontal displacement of the compressor axis and to flex to accommodate for axial expansion and contraction of the compressor, pairs of plates attached at opposite ends to the bedplate and to the discharge end of the compressor and the inlet end of the turbine and disposed so as to resist axial displacement of the compressor and the turbine and vertical displacement of the rotor axes thereof and so as to flex to accommodate for radial expansion and contraction of the compressor and turbine horizontally, a pair of columns attached at opposite ends to the bedplate and to the discharge end of the turbine and disposed so as to resist vertical displacement of the turbine axis and to flex to accommodate for axial expansion and contraction of the turbine and for radial expansion and contraction thereof horizontally, a connection between the discharge end of the compressor and the bedplate and constructed and arranged to resist horizontal displacement of the compressor axis and to accommodate for radial expansion and contraction of the compressor vertically, a connection between the bedplate and the inlet end of the turbine for resisting horizontal displacement of the turbine axis and accommodating for radial expansion and contraction of the turbine vertically, and a connection between the bedplate and the exhaust end of the turbine resisting horizontal displacement of the turbine axis and accommodating for axial expansion and contraction of the turbine and for radial expansion and contraction thereof vertically.

2. The combination as claimed in claim 1 wherein the combustion apparatus includes a circumferential series of combustion units each comprising an elongated tubular housing attached at opposite ends to the compressor and the turbine and wherein each housing includes a joint capable of flexure to accommodate for expansion and contraction of the housing longitudinally.

3. The combination as claimed in claim 1 wherein the connection between the bedplate and the turbine inlet end is comprised by a flexible plate extending parallel to the turbine axis and normally with respect to the vertical plane of such axis.

4. The combination as claimed in claim 1 wherein the connection for the discharge end of the turbine includes a plate portion extending parallel to the turbine axis and a plate portion extending normally with respect to the horizontal and vertical planes of such axis.

5. In combination, a compressor; a turbine axially aligned with the compressor and spaced axially from the latter; combustion apparatus supported by adjacent ends of the compressor and turbine, receiving air from the compressor and delivering gaseous motive fluid to the turbine; and means for supporting the compressor and the turbine so that the axes thereof are confined to predetermined horizontal and vertical planes and so that the compressor and turbine are free to expand and contract axially and radially; said supporting means including a pair of web plates supporting the discharge end of the compressor and a pair of web plates supporting the inlet end of the turbine, said pairs of web plates extending substantially vertically with their planes parallel to the compressor and turbine axes and having their upper ends connected to the compressor and the turbine substantially at the horizontal plane of the axes thereof and in spaced relation to such axes at opposite sides of the latter.

6. Apparatus as claimed in claim 5 wherein the supporting means also includes a pair of substantially vertical columns of circular section having their upper ends connected to the exhaust of the turbine substantially at the horizontal plane of the axis thereof and in spaced relation with respect to such axis at opposite sides of the latter.

7. Apparatus as claimed in claim 5 wherein the supporting means also includes a plate element connected to the inlet end of the turbine and a plate structure connected to the exhaust end of the turbine, said plate element extending parallel to the turbine axis and normally with respect to the vertical plane of the latter and said plate structure comprising a plate portion extending parallel to the turbine axis and normally with respect to the vertical plane of the latter and a plate portion extending normally with respect to both the vertical and horizontal planes of such axis.

8. Apparatus as claimed in claim 5 wherein the supporting means also includes a plate element connected to the inlet end of the turbine, a pair of columns each of circular section connected to the exhaust end of the turbine, and a plate structure connected to the exhaust end of the turbine, said plate element extending parallel to the turbine axis and normally with respect to the vertical plane of the latter, said columns extending substantially vertically and having their upper ends connected to the turbine substantially at the horizontal plane of the axis thereof and being spaced with respect to such axis at opposite sides of the latter, and said plate structure comprising a plate portion extending parallel to the turbine axis and normally with respect to the vertical plane of the latter and a plate portion extending normally with respect to both the horizontal and vertical plane of such axis.

9. Apparatus as claimed in claim 5 wherein the compressor and turbine rotors are connected by a shaft and wherein the combustion apparatus includes a circumferential series of combustion units encompassing the shaft.

10. Apparatus as claimed in claim 5 wherein the compressor and turbine rotors are connected by a shaft and the combustion apparatus comprises a circumferential series of combustion units encompassing the shaft and each unit includes an elongated housing having an expansion joint section.

THOMAS J. PUTZ.
KENNETH R. STEARNS.